Figure 1:
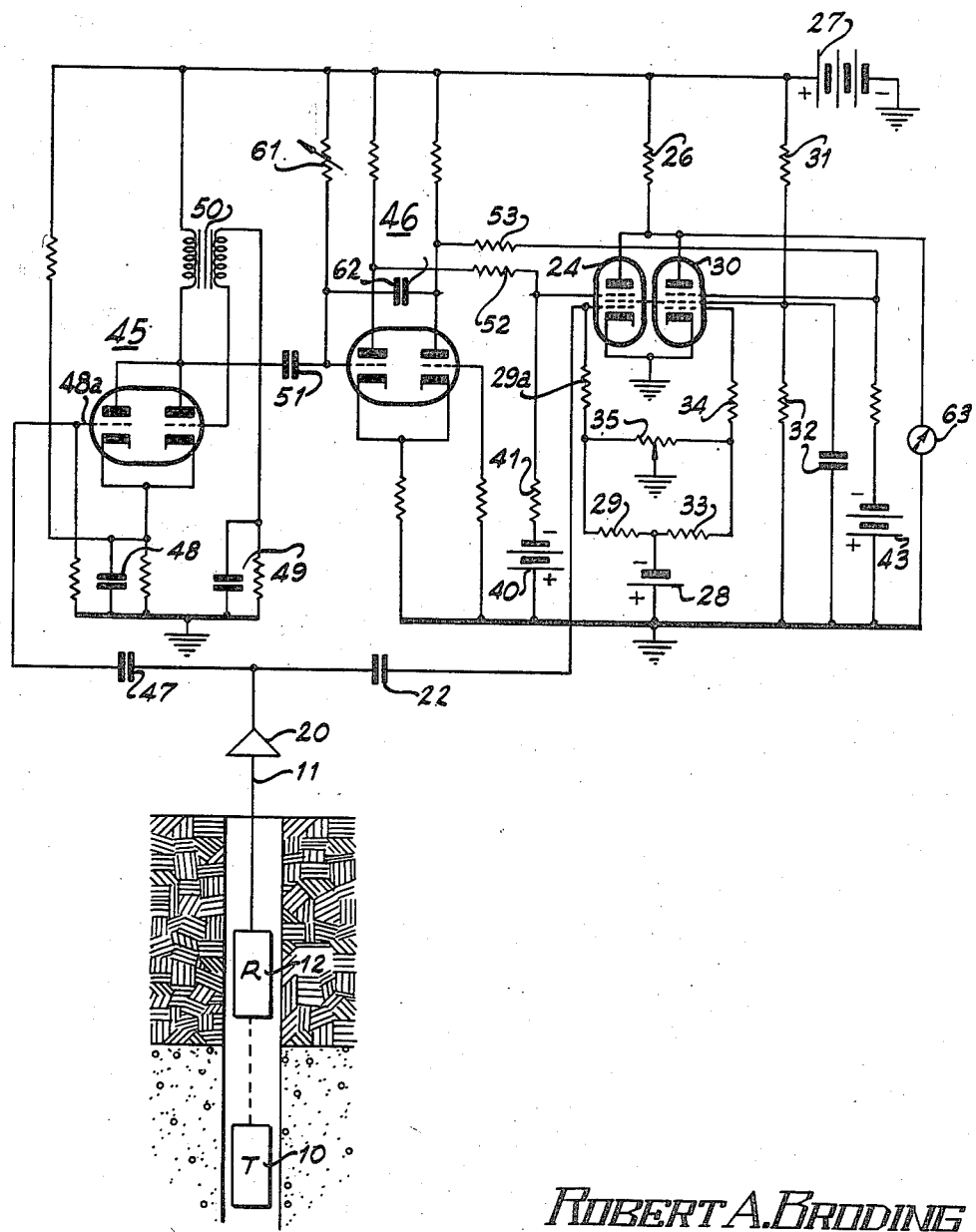

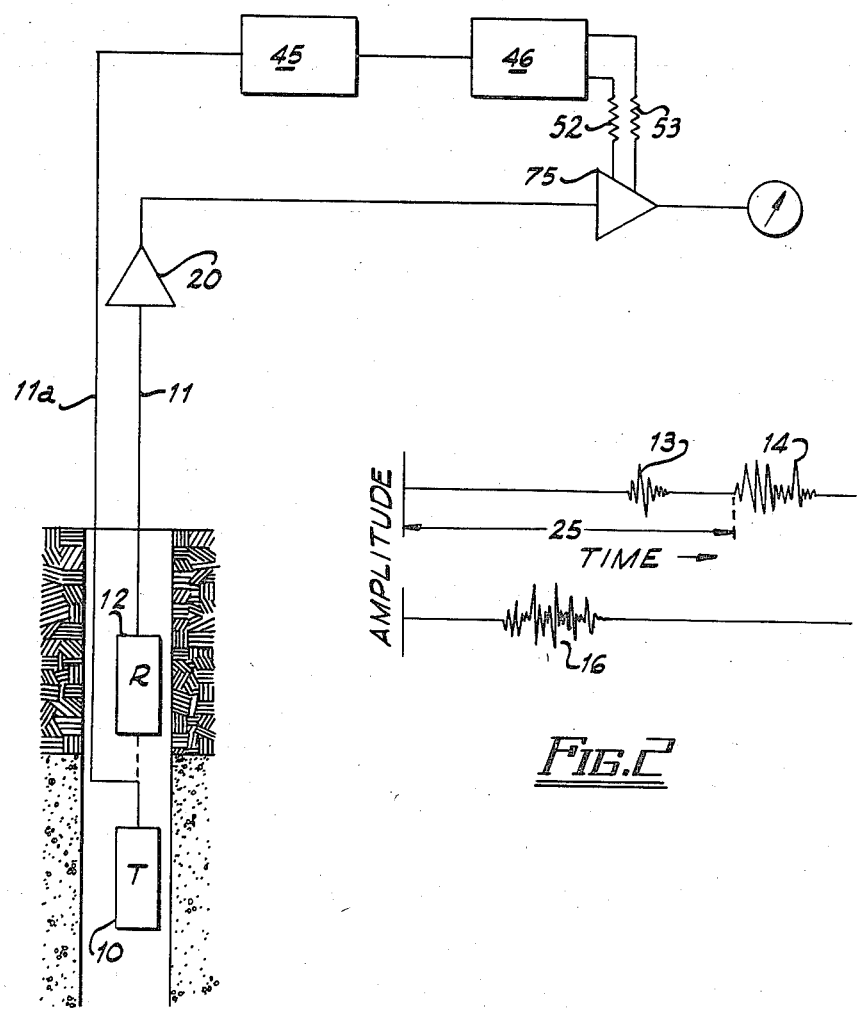

Patented Oct. 12, 1954

2,691,422

UNITED STATES PATENT OFFICE 2,691,422

SELECTIVE PULSE ACOUSTIC WELL LOGGING APPARATUS

Gerald C. Summers and Robert A. Broding, Dallas, Tex., assignors, by mesne assignments, to Socony-Vacuum Oil Company, Incorporated, New York, N. Y., a corporation of New York Application November 22, 1950, Serial No. 197,074

8 Claims. (Cl. 181—0.5)

This invention relates to well logging and more particularly to the measurement of acoustic energy which travels through formations adjacent a well bore.

Generally, in acoustic well logging an acoustic transmitter is movably suspended in the well bore and one or more receivers spaced from the transmitter detect the transmitted energy. There are several distinct paths by way of which energy may reach the receiver. Except in low velocity formations at the earth's surface a compressional wave traveling over a path through the formation immediately adjacent the well bore with a relatively high velocity is first to arrive. A later arriving wave travels through the liquid in the bore hole substantially at the velocity of sound in water.

In prior art acoustic well logging techniques, the total energy of waves traveling via all paths is recorded for the purpose of obtaining an indication of the absorptivity of the formations. However, it has been found that records of more distinctive character may be obtained if particular portions of the waves are measured.

It is an object of the present invention to measure the acoustic wave traveling through the formations adjacent the well bore to the complete exclusion of later arriving waves traveling along other paths.

In one form of the invention, there is provided a transmitter of spaced acoustic impulses movably positioned in a liquid filled well bore together with a receiver spaced a predetermined distance from the transmitter and movable therewith. A signal channel connected to the output of the receiver has associated therewith a control system for blocking the signal channel at a time after each acoustic pulse equal to the distance between the transmitter and receiver divided by the velocity of sound in said liquid, the interval the channel is blocked preferably extending at least until the occurrence of a next succeeding pulse. Thus, only the energy arriving ahead of the direct water wave is passed by the amplifier for measurement or recording.

For a more complete understanding of the present invention and further objects and advantages thereof, reference may now be had to the following description taken in conjunction with the accompanying drawings in which:

Fig. 1 diagrammatically represents a system embodying the present invention;

Fig. 2 illustrates a received signal for two selected spacings between transmitter and receiver; and Fig. 3 is a modification of the system of Fig. 1.

Referring now to Figs. 1 and 2, a transmitter 10 is movably suspended in a bore hole by cable means 11 which extends to surface measuring equipment. The transmitter 10 produces sharp spaced acoustic pulses. While transmitters of various types well known in the art may be suitable, the transmitter illustrated and described in the application Serial No. 181,284 of Pat McDonald for "Acoustic Well Logging System" has been used.

In accordance with the foregoing system, a piezo-electric crystal is excited with a very short voltage pulse. Resultant variations in the dimensions of the crystal produce a pressure pulse of short duration which is transmitted to surrounding media. Other devices such as magnetostriction generators or eletromagnetically driven diaphragms may be found suitable. However, a device which produces pulses of short duration will be preferred over those producing multi-cycle pulses.

The acoustic energy generated by the transmitter 10 may travel to the receiver 12 by way of a first path through the formations and along a second path formed by the liquid in the bore hole. Where formations adjacent a well bore have a velocity higher than the velocity of sound in an unbounded body of liquid having the same properties as the liquid encountered in the bore hole, a compressional wave traveling through the formations will arrive at the receiver ahead of the pressure wave traveling through the liquid path. Even though the actual velocity of a high frequency sound pulse through a liquid in a tubular chamber such as a bore hole is not positively known, it may be considered to be equal to or less than the velocity of sound in an unbounded body of the bore hole fluid. At all depths below a few hundred feet from the earth's surface, the velocity of compressional waves through the formations is found to be higher than the velocity of sound, i. e., higher than velocities in the neighborhood of 4800 feet/second in an unbounded body of the bore hole liquid. This difference between the velocities of two waves traveling between the transmitter 10 and receiver 12 makes possible the separation of the two waves at the receiver to permit the measurement of a selected one of them.

For example, in Fig. 2 the first pulse 13 is representative of energy traveling from transmitter 10 to receiver 12 by way of the formations. This is generally termed a longitudinal compressional wave. The pulse 14 represents energy traveling directly up the bore hole through the liquid column. By the present invention, the first pulse 13 is measured to the complete exclusion of the second pulse 14.

It is to be noted that in Fig. 2, the pulses are clearly distinct and separate, the separation being of this nature because the spacing between the transmitter and receiver is sufficient to make a corresponding difference in time required for a pulse to travel therebetween over two different paths. However, to obtain information concerning the formations with detail necessary to make it most useful, the spacing may not be great enough to permit such clear separation between the pulse arrivals. On the contrary, the more general case is illustrated by the pulse 16 of Fig. 2, where the longitudinal compressional wave 13 and the wave 14 are mixed to form a composite signal 16. Spacings in the order of 5 feet are generally used in order to be able to pick up formation detail in an optimum manner. For such small spacings the signal arrivals are intermixed.

In accordance with the present invention only received energy traveling via the formations and forming at least a part of the pulse 16 is measured, even in the presence of co-mingling of the two pulses. This is accomplished by providing a measuring system at the surface of the earth that in one form is normally blocked but which is rendered operative so as to be responsive to energy from the receiver 12 only in the interval between the generation of the acoustic pulse by transmitter 10 and the arrival at the receiver 12 of the energy forming the first time portion of the direct wave 14.

Fig. 1 includes a system for measuring the selected signal from the receiver 12. Cable 11 interconnects receiver 12 and an amplifier 20 which, in general, is always responsive to the output of receiver 12. The output of amplifier 20 is coupled by way of condenser 22 to the control grid of a first pentode amplifier 24 which has its cathode connected directly to ground and its anode connected by way of a plate load resistor 26 to the B+ terminal of a battery 27. The biasing voltage for the control grid of tube 24 is supplied by way of a battery 28 and resistors 29 and 29a.

In addition to pentode 24, there is provided a compensating network including a second pentode 30 having its anode, cathode and screen grid connected in parallel to corresponding elements of the pentode 24. This tube is utilized to permit abrupt suppression of the gain of the tube 24 without the generation of unwanted transients in its output circuit. The screen grids of tubes 24 and 30 are connected to B+ terminal of battery 27 by way of resistor 31. The screen grids are also coupled to ground by way of the condenser-resistor combination 32. The control grid of the compensating tube 30 is connected to battery 28 by way of resistors 33 and 34 in order to provide a negative grid biasing voltage. A potentiometer 35 connected to the control grids of tubes 24 and 30 has its variable tap connected to ground. Variations in the position of the tap on potentiometer 35 varies the anode currents in opposite senses and is thus a means of balancing the anode currents in tubes 24 and 30. The suppressor grid of the pentode 24 is normally biased beyond cut-off by a battery 40 connected at its positive terminal to ground and at its negative terminal to the suppressor grid by way of a resistor 41. Similarly, pentode 30 is biased to cut-off by battery 43 similarly connected in its suppressor grid circuit.

In operation pentode 30 is normally conducting and pentode 24 is blocked. However, under the control of and in response to the output of a gating unit, the pentode 24 conducts following the generation of a pressure pulse by transmitter 10 and prior to the arrival of the wave 14 at receiver 12 to amplify that portion of the wave 13 arriving ahead of the wave 14.

A control or gating unit for control of pentodes 24 and 30 includes a blocking oscillator 45 and a monostable multivibrator 46. The output of the amplifier 20 is coupled to the input stage of the blocking oscillator 45 by way of a circuit which includes the condenser 47. The blocking oscillator 45 is of the type illustrated and described in M. I. T. Radiation Laboratory Series, vol. 19, Waveforms, McGraw-Hill, 1949, at page 218, Fig. 6.7, and therefore will not be described in detail. However, the R. C. networks 48 and 49 are constructed as to have time constants such that, following application thereto of a triggering pulse from amplifier 20, the circuit remains blocked for a selected time interval. More particularly the grid 48a of the input stage is at a high negative potential after receipt of pulse 13 from amplifier 20 so that oscillator 45 will operate but once in the period between successive pulses from transmitter 10. In response to the first cycle or oscillation of pulse 13 a single cycle voltage oscillation is produced in the transformer 50 by the blocking oscillator 45.

The voltage across the primary of transformer 50 is coupled by way of condenser 51 to the input grid of the multivibrator 46. The signal input stage of the multivibrator 46 is normally conductive. The anode of the input stage of multivibrator 46 is coupled by way of resistor 52 to the suppressor grid of the pentode 24. The anode of the second or output stage of the multivibrator 46 is coupled by way of resistor 53 to the suppressor grid of the pentode 30. Since the input stage of circuit 46 is normally conductive, its anode is less positive than the anode of the second stage. The positive voltage coupled from the anode of the second stage of multivibrator 46 to the suppressor of the pentode 30 raises the suppressor voltage by overcoming the negative voltage of the biasing battery 43 so that, as above mentioned, tube 30 is normally conducting.

In operation, upon arrival of pulse 13 at receiver 12 the blocking oscillator 45 is triggered and the output thereof, applied to the multivibrator 46 by way of condenser 51, immediately renders the input stage of circuit 46 non-conducting and turns on the pentode 24, i. e., the voltage on the suppressor grid of tube 24 is raised and the suppressor grid of the pentode 30 is driven negative to plate current cutoff. Thus, as the pulse 13 is applied by way of condenser 22 to the input grid of tube 24, the tube is rendered conductive and the portion of the pulse 13 arriving at receiver 12 in the interval that the multivibrator 46 is in its unstable state is amplified and appears as a signal voltage across the plate load resistor 26.

The interval during which the pentode 24 is conducting is determined by the time constant of the multivibrator 46 as controlled by the variable resistor 61 and the condenser 62. This interval must be short enough that tube 24, in all cases and in all formations encountered and with a given separation between transmitter and receiver, will be blocked upon the arrival of the direct wave. In this manner the portion of the longitudinal compressional wave arriving ahead of the direct water wave produces the output voltage at resistor 26. This voltage may then be measured and/or recorded. Design considerations for assuring that the signal channel is blocked at or before the arrival of the water wave will be hereinafter given.

The voltage at the output of tube 24 may then be measured to indicate variations in the attenuation of an acoustic pulse in passing through selected formation sections. The measuring system is generically illustrated by the meter 63. In general a measuring system capable of indicating a value proportional to the peak amplitude of the wave 14 is suitable. Commercial peak reading electronic voltmeters will be found to be particularly suitable. In one adaptation of the invention, the peak value of the pulse 13 was measured by connecting an RCA "High Frequency Volt-Ohmyst" type WV–75A directly across the output of tube 24. In accordance with conventional well logging practice the pulse 13 was measured continuously as a function of bore hole depth by connecting a recording potentiometer in series with the meter of the above-identified Volt-Ohmyst whereupon the pen of the recorder was actuated in proportion to the peak value of the pulse 13. Details of the recorder and the mechanism for driving the paper in proportion to the depth of the transmitter 10 and receiver 12 in the bore hole are well known and understood by those skilled in the art and are therefore not described in detail.

A modified form of the invention has been illustrated in Fig. 3. Where consistent, parts have been designated by the same reference characters as in Fig. 1. In this system the signal from receiver 12 is transmitted by way of circuit 11 to the amplifier 20 and thence to the gated amplifier 75 which in block diagram form is representative of the circuits of pentodes 24 and 30 of Fig. 1. A signal generated by the transmitter 10 coincident with transmission of the acoustic pulse is transmitted up hole over circuit 11a to actuate the blocking oscillator 45 which in turn triggers the multivibrator 46. The output of multivibrator 46 is coupled to the amplifier 75 by way of the resistors 52 and 53 to gate the amplifier 75 to permit passage therethrough of the signal from the receiver 12. By actuating the multivibrator 46 at the instant of transmission of the acoustic pulse from transmitter 10 or at an instant slightly later, if such a delay is necessary to eliminate the energy cross-fed through the cable, the period during which amplifier 75 is conducting may be computed to include all of the first wave 13 that arrives ahead of the pulse 14 and positively to eliminate passage therethrough of any portion of the wave 14. More particularly, the unstable period of the timer or multivibrator 46 may be made exactly equal to the time interval (t) calculated by dividing the spacing (S) between transmitter 10 and receiver 12 by the velocity (C) of sound in the bore hole media, ordinarily a fluid or liquid, $$t = \frac{S}{C}$$

Thus, is this system amplifier 75 becomes blocked at the time of arrival of the wave 14 or immediately preceding its arrival. Regardless of the extent of mixing of the formation wave 13 and the wave 14, the amplifier 75 passes only the portion of the formation wave that arrives ahead of the direct wave 14. This system may be used in place of the modification illustrated in Fig. 1 and permits positive determination of the instant the amplifier should be blocked in order to assure exclusion of energy from pulse 14.

In a system constructed in accordance with Fig. 1, the transmitter 10 and receiver 12 were spaced five feet apart and acoustic pulses were generated at the rate of approximately 20 per second. The period of the multivibrator 46 was set at approximately 200 microseconds. This period may be extended somewhat with satisfactory results. In general the period should be made as long as possible without permitting passage of pulse 14 in order to permit pulse 13 to build up to its maximum value. The period may thus be varied depending upon the ratio of the velocity in the bore hole liquid to the velocity in the formations being studied and upon the spacing between the transmitter and receiver. In the system of Fig. 3, the multivibrator period was set at approximately .001 second.

While particular embodiments of the invention have been illustrated and described, it will be undertsood that further modifications will now suggest themselves to those skilled in the art. It is therefore intended to cover such modifications of the invention as fall within the scope of the appended claims.

What is claimed is:

1. In an acoustic well logging system having a transmitter and a receiver of acoustic pulses spaced a predetermined distance apart and supported for movement in a liquid-filled well bore the combination comprising an amplifier, circuit means for applying the output of said receiver to said amplifier, means for biasing said amplifier to plate current cutoff, a monostable multivibrator having a normally conductive tube and characterized by an unstable period equal to said predetermined distance divided by the velocity of sound in water, a common connection between said biasing means and the output of said normally conducting tube for raising the bias on said tube for conduction therein, and means connected between said transmitter and said multivibrator for actuating said multivibrator coincident with transmission of each of said acoustic pulses whereby said amplifier is conductive following each acoustic pulse and is non-conductive from the arrival of acoustic energy through said liquid until generation of a succeeding acoustic pulse by said transmitter.

2. In an acoustic well logging system having a transmitter of acoustic pulses movably positioned in a bore hole together with an acoustic receiver spaced a predetermined distance from said transmitter, the combination therewith which comprises a pentode amplifier having an anode, cathode, control grid, screen grid, and suppresser grid, means for applying the output of said receiver to said control grid, biasing means connected to said suppresser grid to maintain said amplifier normally non-conductive, a control network connected to said suppresser grid and actuated in response to said acoustic impulses for supplying a biasing potential in opposition to said biasing means to permit conduction through said pentode amplifier in the interval following generation of said acoustic impulses, time controlling means to said control network for rendering said control network inoperative at an instant not beyond a time after generation of said acoustic impulses equal to said predetermined distance divided by the velocity of sound in the bore hole liquid, and means for measuring the peak value of the output of said pentode amplifier.

3. In an acoustic well logging system having a transmitter of acoustic impulses movably positioned in a bore hole together with an acoustic receiver spaced a predetermined distance from said transmitter, the combination therewith which comprises a pentode amplifier having an anode, cathode, control grid, screen grid, and suppresser grid, cable means extending from said receiver to said control grid for applying the output of said receiver to said control grid, biasing means connected to said suppresser grid to maintain said pentode amplifier normally non-conductive, a gating circuit connected to said suppresser grid, means actuated in timed relation with respect to said acoustic impulses and connected to said gating circuit for actuating said gating circuit to apply a biasing potential to said suppressor grid in opposition to said biasing means for conduction of impulses from said receiver through said pentode in the interval following generation of said acoustic impulses, an R-C circuit controlling said gating network to remove said biasing potential at a time after the generation of said acoustic impulses equal to said predetermined distance divided by the velocity of sound in the bore hole liquid, and means connected to said anode for measuring the peak value of said acoustic pulses arriving at said receiver in the interval said pentode is conductive.

4. In an acoustic well logging system having a transmitter of acoustic impulses movably positioned in a bore hole together with an acoustic receiver spaced a predetermined distance from said transmitter, the combination therewith which comprises a pentode amplifier having an anode, cathode, control grid, screen grid, and suppresser grid, cable means extending from said receiver to said control grid for applying the output of said receiver to said control grid, biasing means connected to said suppresser grid to maintain said pentode amplifier normally non-conductive, a monostable multivibrator connected to said suppresser grid, means connected in circuit with said transmitter and connected to said multivibrator for driving said multivibrator into its unstable state upon generation of said impulses for application of a biasing potential to said suppresser grid in opposition to said biasing means for conduction of impulses from said receiver through said pentode in the interval following generation of said acoustic impulses, an R-C circuit in said multivibrator having a time constant equal to said predetermined distance divided by the velocity of sound in the bore hole liquid to return said multivibrator to its stable state to remove said biasing potential, and means connected to said anode for measuring the peak value of said acoustic pulses arriving at said receiver in the interval said pentode is conductive.

5. In an acoustic well logging system having a transmitter of acoustic impulses movably positioned in a bore hole together with an acoustic receiver spaced a predetermined distance from said transmitter, the combination therewith which comprises a pentode amplifier having an anode, cathode, control grid, screen grid, and suppresser grid, cable means extending from said receiver to said control grid for applying the output of said receiver to said control grid, biasing means connected to said suppresser grid to maintain said pentode amplifier normally non-conductive, a monostable multivibrator having a normally conducting and a normally non-conducting stage, a circuit between the output of said normally conducting stage and said suppresser grid, a blocking oscillator actuated in timed relation with respect to said acoustic impulses and connected to the input of said multivibrator for application of the potential at said output to said suppresser grid in opposition to said biasing means for conduction of impulses from said receiver through said pentode in the interval following generation of said acoustic impulses, means for restoring said multivibrator to equilibrium at an instant after the generation of said acoustic impulses equal to said predetermined distance divided by the velocity of sound in the bore hole liquid, and means connected to said anode for measuring the peak value of said acoustic pulses arriving at said receiver in the interval said pentode is conductive.

6. A system for logging a liquid filled well bore which comprises means for generating sharp spaced acoustic pulses at a first point in said well bore for transmission of acoustic energy from said point through formations adjacent said well bore and through the bore hole liquid, means for generating electrical signals corresponding with the arrival of said acoustic energy at a second point in said well bore spaced a predetermined distance from said first point, means for continuously varying the location of said points along said well bore while maintaining constant said predetermined distance, and measuring means responsive to the energy in the portions of said electrical signals generated in the intervals beginning with the generation of each of said sharp spaced pulses and terminating at a time thereafter equal to said predetermined distance divided by the velocity of sound in said bore hole liquid, said measuring means including a timer for rendering said measuring means insensitive to energy received after expiration of each of said time intervals.

7. An acoustic well logging system comprising a transmitter of spaced acoustic impulses supported for movement along a well bore, a receiver spaced a predetermined distance from and movable with said transmitter for producing electrical signals representative of received acoustic impulses, signal amplitude measuring means, a signal channel having output terminals connected to said measuring means and an input connected to said receiver providing a transmission path for said electrical signals to said measuring means, a conductivity control network connected to said signal channel, and means actuated in response to said acoustic impulses for actuating said control network to render said signal channel conductive for a predetermined time interval after generation of said acoustic impulses for transmission of preselected time segments of said electrical signals to said measuring means.

8. An acoustic well-logging system comprising a transmitter for producing acoustic pulses, a receiver for producing an output upon application thereto of said pulses, structure supporting said transmitter and receiver in a well bore spaced a predetermined distance one from the other along said well bore, an amplitude-measuring system having an input circuit connected to said receiver and responsive to varying amplitudes of said pulses detected thereby, control means for said measuring system for respectively rendering it operative and inoperative to measure amplitudes of said pulses as detected by said receiver, said control means including a timer for rendering said measuring means inoperative a time interval after initiation of each of said acoustic pulses of length equal to the separation distance between said transmitter and receiver within said well bore divided by the velocity of sound in the well bore fluid disposed between said transmitter and receiver, thereby to restrict said amplitude measurement of pulses detected by said receiver to those transmitter through strata adjacent the walls of said well bore in which the velocity of sound therein exceeds the velocity of sound in said well bore fluid and to exclude amplitude measurement of pulses transmitted through said well bore fluid.

References Cited in the file of this patent

UNITED STATES PATENTS

| Number | Name | Date |
|---|---|---|
| 2,191,119 | Schlumberger | Feb. 20, 1940 |
| 2,200,476 | Mounce | May 14, 1940 |
| 2,225,668 | Subkow et al. | Dec. 24, 1940 |
| 2,231,243 | Beers | Feb. 11, 1941 |
| 2,233,992 | Wyckoff | Mar. 4, 1941 |
| 2,238,991 | Cloud | Apr. 22, 1941 |
| 2,350,371 | Smith | June 6, 1944 |
| 2,522,433 | Dahlberg, Jr. | Sept. 12, 1950 |